United States Patent [19]
Hofsaess et al.

[11] Patent Number: 5,279,271
[45] Date of Patent: Jan. 18, 1994

[54] CONTROL SYSTEM FOR AN INTERNAL COMBUSTION ENGINE AND/OR MOTOR VEHICLE

[75] Inventors: Michael Hofsaess, Ludwigsburg; Martin Rutz, Schwieberdingen; Harald Schweren, Korntal-Muenchingen, all of Fed. Rep. of Germany

[73] Assignee: Robert Bosch GmbH, Stuttgart, Fed. Rep. of Germany

[21] Appl. No.: 18,254

[22] Filed: Feb. 16, 1993

Related U.S. Application Data

[63] Continuation of Ser. No. 718,640, Jun. 21, 1991, abandoned.

[30] Foreign Application Priority Data

Jun. 29, 1990 [DE] Fed. Rep. of Germany ....... 4020654

[51] Int. Cl.$^5$ .............................................. F02D 41/02
[52] U.S. Cl. .................................. 123/350; 123/353; 123/399; 364/431.07
[58] Field of Search ............... 123/353, 399, 352, 350, 123/339, 357, 360, 361

[56] References Cited

U.S. PATENT DOCUMENTS

| | | | |
|---|---|---|---|
| 4,306,527 | 12/1981 | Kinugawa et al. | 123/352 |
| 4,474,154 | 10/1984 | Henning et al. | 123/352 |
| 4,721,176 | 1/1988 | Kabasin et al. | 123/399 |

FOREIGN PATENT DOCUMENTS

| | | | |
|---|---|---|---|
| 3621937 | 1/1988 | Fed. Rep. of Germany . | |
| 56-113020 | 9/1981 | Japan | 123/353 |
| 63-223350 | 9/1988 | Japan | 123/350 |

*Primary Examiner*—Andrew M. Dolinar
*Attorney, Agent, or Firm*—Walter Ottesen

[57] ABSTRACT

The invention is directed to a control system in combination with an internal combustion engine and/or a motor vehicle especially in connection with the air metered to the engine. An electrically actuable element for influencing an operating variable of the engine and/or of the vehicle is present. A control unit acts on the electrically actuable element by means of a pulse-shaped signal. At least one changeable parameter of the pulse-shaped signal is changed during a pulse dependent upon actual measured values.

10 Claims, 3 Drawing Sheets

FIG. 2a
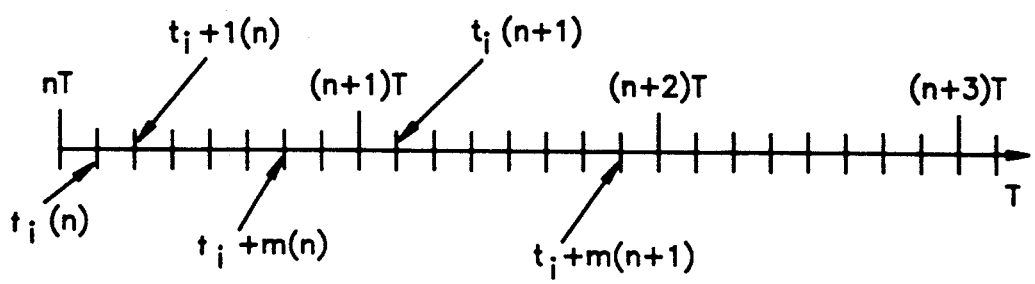
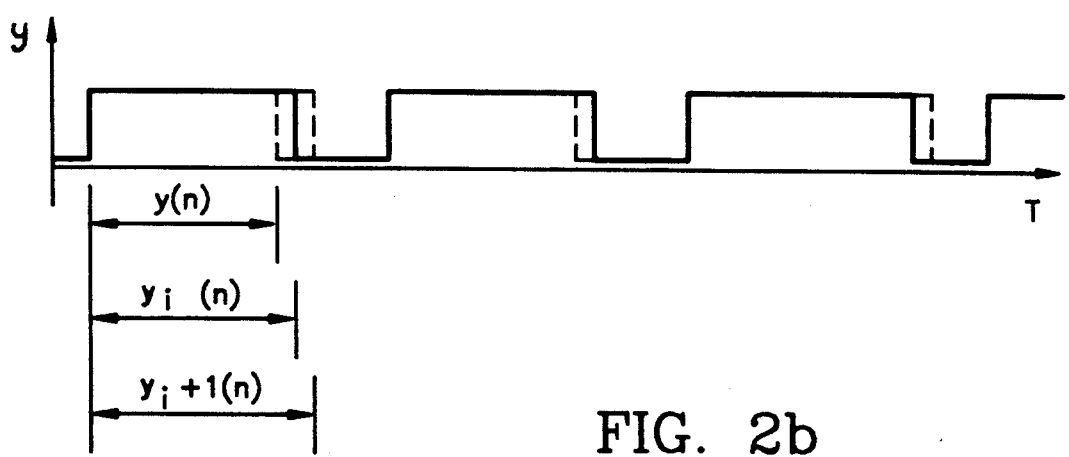
FIG. 2b

CONTROL SYSTEM FOR AN INTERNAL COMBUSTION ENGINE AND/OR MOTOR VEHICLE

This is a continuation of application Ser. No. 07/718,640, filed Jun. 21, 1991, now abandoned.

FIELD OF THE INVENTION

The invention relates to a control system in combination with an internal combustion engine and/or a motor vehicle with the system including a control unit which operates by means of a pulse-shaped signal on an electrically actuable element for influencing an operating variable of the engine and/or of the motor vehicle.

BACKGROUND OF THE INVENTION

In motor vehicle technology, it is known to operate on an operating characteristic variable of an internal combustion engine and/or of the motor vehicle for control purposes. An electrically actuable element is driven by pulse-shaped signals and the control can be a closed-loop control or an open-loop control.

A system of this kind is disclosed in German patent publication DE-OS 3,621,937 with the system being applied to an electronic engine power control arrangement as an example. In this system, a pulse-shaped drive signal is generated by a computer unit in dependence upon measured values, especially the position of a power positioning element of the engine and a service element actuable by the driver. The signal generated in this manner is for an actuator influencing the power of the engine and at least one parameter of the drive signal is changeable such as the pulse width at fixed drive periods of the drive signal. The system described in this publication carries out a control of the position of the power actuator for controlling engine power. With the realization of a control system of this kind in digital form, the difficulty occurs that the control does not provide the desired characteristics with respect to dynamics, stability and/or precision because, in order to determine the pulse-shaped drive signal, the measured values are used which were detected directly in advance of the drive period of the drive signal or during a previous drive period. Accordingly, the drive signal formed on the basis of these measured values does not consider the changes occurring during the immediate drive period with reference to the control segment and/or its limit conditions.

SUMMARY OF THE INVENTION

In view of the foregoing, it is an object of the invention to provide a control system which improves the characteristics of the control with reference to dynamics, stability and precision. According to a feature of the invention, this object is achieved in that the at least one changeable parameter of the pulse-shaped signal is changed in dependence upon actual measured values while the control unit emits a pulse-shaped signal for driving purposes with this pulse-shaped signal being formed on the basis of a parameter thereof determined at an earlier time point.

With the measures provided by the invention, the dynamic performance of the open-loop and/or closed-loop control system as well as its precision is considerably improved because the drive signal is modified in correspondence to the most pertinent measured value.

The improvements obtained in this manner are obvious especially with desired-value jumps to which the control system responds with corresponding speed because of the approach provided by the invention. Desired-value jumps of this kind occur especially in motor vehicles in connection with the drive-slip control (ASR). In ASR-systems, with the approach of the invention, a rapid reaction of the control system is obtained and therefore a rapid reduction of engine power from drive wheels which tend to slip and therefore an improved functioning of the system.

Because of the advantages described above, the solution provided by the invention affords advantages with other systems for controlling the air flow to the engine such as idle engine speed controls, electronic engine power controls and the like. A still further advantageous application is provided in connection with the metering of fuel.

A further advantage of the procedure provided by the invention is seen in that the digital realization of the control system or the controller can start from a quasi-continuous system with respect to development criteria and stability considerations of the control loop.

BRIEF DESCRIPTION OF THE DRAWINGS

The invention will now be described with reference to the drawings wherein:

FIGS. 2a and 2b show a pulse-shaped drive signal as an example wherein the pulse width and therefore the duty cycle is changed and show the effects of the procedure provided by the invention on the waveform of the signal; and, FIG. 3 shows an embodiment of a flowchart which operates in the control unit for determining the pulse-shaped drive signal.

DESCRIPTION OF THE PREFERRED EMBODIMENTS OF THE INVENTION

Figure 1:
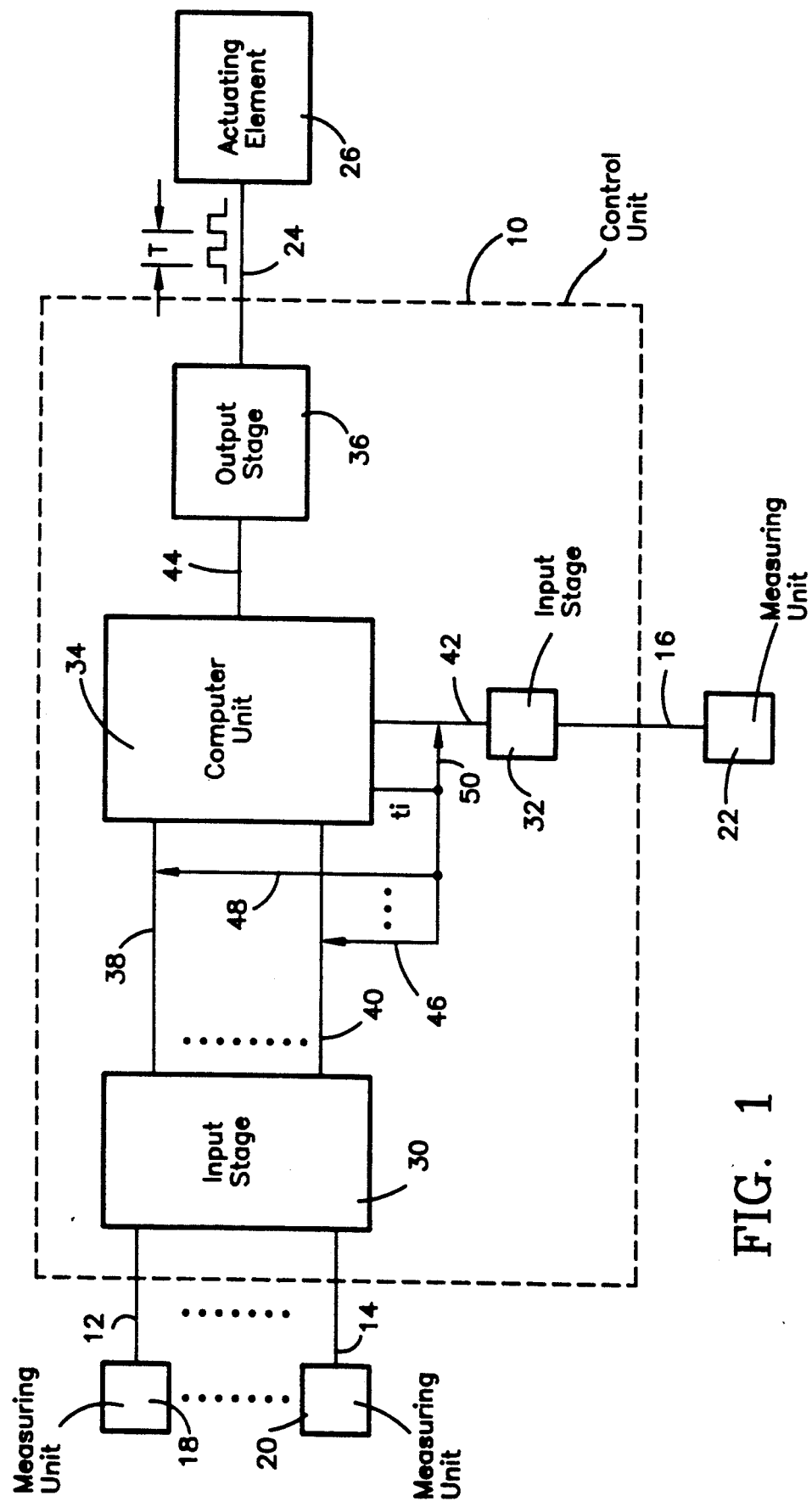
FIG. 1 is a schematic block diagram of a control system (open-loop or closed-loop) having an actuating element driven by means of a pulse-shaped signal.

In FIG. 1, a control system (open-loop or closed-loop) is shown for an operating variable of an internal combustion engine (not shown) and/or of a motor vehicle. This system includes essentially a control unit 10 (open-loop or closed-loop) to which are supplied via the input lines 12 to 14 and 16 measurable operating variables of the engine and/or of the vehicle from respective measuring units 18 to 20 and 22. The output line 24 of the control unit 10 connects this unit to an electrically actuable element 26 such as an actuating element which acts on the operating variable to be controlled (open-loop or closed-loop).

In automobile technology, there are many open-loop and closed-loop systems known which operate with an arrangement corresponding to that shown in FIG. 1. The approach provided by the invention affords special advantages in connection with ASR/MSR-systems, electronic engine power controls or idle engine speed controls. These systems or controls generally include position controls of the power actuating element of the engine which controls the supply of operating mixture to the engine. Accordingly, and in the context of one embodiment, an electrically actuable throttle flap can be understood to be an actuating element while the measuring unit 22 defines a position transducer which is connected to the throttle flap and supplies a signal to the control unit 10 which represents the position of the throttle flap.

The procedure afforded by the invention can also be applied to other pulse-controlled actuating elements.

The input lines 12 to 14 supply signals to the control system which represent operating variables of the engine and/or of the motor vehicle and function for forming desired values for the control system. In an ASR/MSR-system, the signals are those which represent the rotational speed of the wheels of the vehicle as well as a road speed signal and/or an engine speed signal. From these signals, a position desired value of the power actuating element for reducing engine power is determined which makes possible a stabilization of the driving performance of the motor vehicle. An electronic engine power control furthermore has the signal of a position transducer of a service element actuable by the driver with the desired value for the position control of the power actuator being determined in dependence upon this signal. For idle speed controls, measured values for the battery voltage, the engine temperature and/or signals are processed with the signals indicating the operation of an air conditioner or a power-assisted steering system.

In the same manner, the control system can relate to a control for engine speed with the actual-value signal being defined by an engine speed signal with the actual-value signal being supplied via the input line 16 from the measuring unit 22 to the control unit.

The control unit 10 includes essentially the input stage 30 assigned to the input lines 12 to 14 and the input stage 32 assigned to input line 16, a computer unit 34 as well as an output stage 36 assigned to the output line 24. The input stage 30 is connected at one end to the input lines 12 to 14 and at the other end to he connecting lines 38 to 40 which connect the input stage 30 to the computer unit 34.

The connecting lines 38 to 40 correspond to respective ones of input lines 12 to 14 and transmit the signal variables conducted by the input lines 12 to 14 to the computer unit 34.

The input stage 32 assigned to the input line 16 includes an output line 42 which connects the input stage 32 to the computer unit 34. The computer unit 34 includes an output line 44 which connects the computer unit 34 to the output stage 36 with the output line of the output stage 36 being the output line 24 of the control system.

The signals representing the above operating parameters are detected by the measuring units 18 to 20, respectively, and are supplied via corresponding ones of the input lines 12 to 14 to the input stage 30 where they are prepared for further processing by the computer 34. This processing can, for example, be an adaptation of the signal level, a smoothing of the signal or like measures for generating a defined measurement signal. In addition, an analog/digital conversion can be performed in the input stage 30. The processed signal values are transmitted via the connecting lines 38 to 40 to the computer unit 34 for computing the desired value of the control system and for corresponding further processing.

The actual-value signal detected by the measuring unit 22 and transmitted via the input line 16 to the input stage 32 is processed in the same manner. The signal values processed in the input stage 32 are supplied via the connecting line 42 to the computer unit 34 for further processing.

The computer unit 34 performs the computations necessary for control of the operating variable and generates a signal in correspondence to the control purposes with the signal operating to drive the actuating element 26. For a position control of the power actuating element, the computer unit 34 computes the desired value for the position of the actuating element from the signal variables supplied via the connecting lines 38 to 40 and compares this desired value with the actual signal value supplied via the connecting line 42 and determines the changeable parameter of the drive signal of the actuating element from a comparison of the desired and actual values in accordance with a pregiven control algorithm so that the difference between the desired and actual values is reduced. In the embodiment shown, the signal of concern is the drive signal in the form of a pulse-shaped signal wherein the changeable parameter is the pulse width y or the pulse duty ratio of the signal. In this special embodiment, the drive signal has a fixed drive period T or drive frequency.

In addition to this embodiment, the procedure afforded by the invention is advantageously applied to systems which influence the period, the signal level or the range of low voltage of the pulse-shaped signal.

Also, systems are known which have several pulse-shaped drive signals and drive a multi-phase motor with a pregiven relationship being present between the drive signals. The procedure afforded by the invention also finds application here.

To compute the pulse width of the pulse-shaped drive signal, the invention provides that the signal variables forming the desired value and the actual value are detected at pregiven scanning time points $t_i$ which occur during a drive period T of the drive signal in pregiven time intervals. This is represented symbolically by the lines 46 to 48 and 50 in FIG. 1. This representation shows that the computer unit 34 detects the corresponding signal variables at the pregiven scanning time points $t_i$ for newly computing the pulse width of the drive signal. For this purpose, a desired value formed from the signal variables on the lines 38 to 40 is compared to the actual value and the pulse width is computed according to the difference.

At the beginning of the drive period T of the drive signal, the positive flank of the particular pulse of the drive signal is generated in that the output signal of the control system is set to a higher level with the beginning of the drive period T being the first scanning time point $t_i$ of the particular drive period T. Here, a value is pregiven as the pulse width which is computed in dependence upon the desired and actual values computed or detected at this time point. At every scanning time point $t_i$, the computer unit computes the pulse width anew until the computed pulse end is reached. In this way, the pulse end determined by the pulse width is newly determined at each scanning time point in dependence upon the desired-actual difference and considers thereby the conditions of the control system at this time.

FIG. 2 shows the procedure of the invention for computing the pulse width of the drive signal in the context of an example of time diagrams. In FIG. 2a, a time scale has pregiven time points T dependent upon the type of actuating element to be driven with the spacing thereof determining the fixed drive period or drive frequency of the drive signal. In FIG. 2a, the time points nT to (n+3)T are shown. Within a drive period, scanning time points are provided in pregiven intervals for detecting or determining the desired and actual values which are identified in FIG. 2a by $t_i$.

The time-dependent waveform of the pulse-shaped drive signal is shown in FIG. 2b. The vertical axis represents the signal level of the drive signal whereas the horizontal axis represents the time.

The description of the pulse width computation and its effect on the signal waveform of the drive signal is shown in the following embodiment of the drive period nT.

Basic to the procedure provided by the invention is that a desired and an actual value are determined or detected at each particular scanning time point to which also belongs the time point nT characterizing the start of a drive period and, on the basis of these desired and actual values, the pulse width is computed which is needed for driving the actuating element under the particular conditions.

The time point nT identifies the start of the drive period. At this time point nT, the positive flank of a pulse of the pulse-shaped drive signal according to FIG. 2b is generated by the issuance of a high signal level. At the same time, a pulse width y(n) is determined from the measured or determined desired and actual values with the pulse width y(n) being the basis for the correction taking place at the scanning time points which follow.

At the next scanning time point $t_i(n)$, a renewed detection or determination of the desired and actual values of the control system takes place by scanning the corresponding signals and a renewed computation of the pulse width is made. If a difference results between the two sequentially determined pulse widths, then the pulse width y(n) determined at the beginning of the drive period is corrected on the basis of the pulse width $y_i(n)$ determined at the first scanning time point. In the example of FIGS. 2a and 2b, this leads to a reduction of the pulse width shown by the broken line in FIG. 2b. This means that the negative flank and therefore the pulse end are shifted to an earlier time point. The same procedure is applied to the next scanning time point $t_{i+1}(n)$ In FIG. 2b, the correction of the pulse end made starting from the computed pulse width $y_{i+1}(n)$ at time point $t_{i+1}(n)$ is shifted with respect to the negative flank shown by the broken line and shifted to a later time point. The same procedure is applied to the scanning time points following the time point $t_{i+1}(n)$.

In FIGS. 2a and 2b, it is assumed that a further correction of the pulse width is no longer necessary at the following scanning time points since the difference between two sequential computations does not exceed a pregiven tolerance value. The pulse is ended that is, a lower signal level is emitted as soon as the computed and possibly corrected pulse end has been reached. At the following scanning time point, shown in FIG. 2a with $t_{i+m}(n)$, the computation undertaken on the basis of the then present desired or actual values is not further processed.

At the next drive start (n+1)T, the computation and correction begin anew. The pulse width for the next drive period can be newly determined at time point (n+1)T or be determined on the basis of the corrected pulse width from the previous drive period nT or its last scanning time point according to the above description of the correction.

A new computation of the pulse while considering the particular scanning time point can be undertaken as an alternative to the correction of the particular pulse end.

Figure 3:
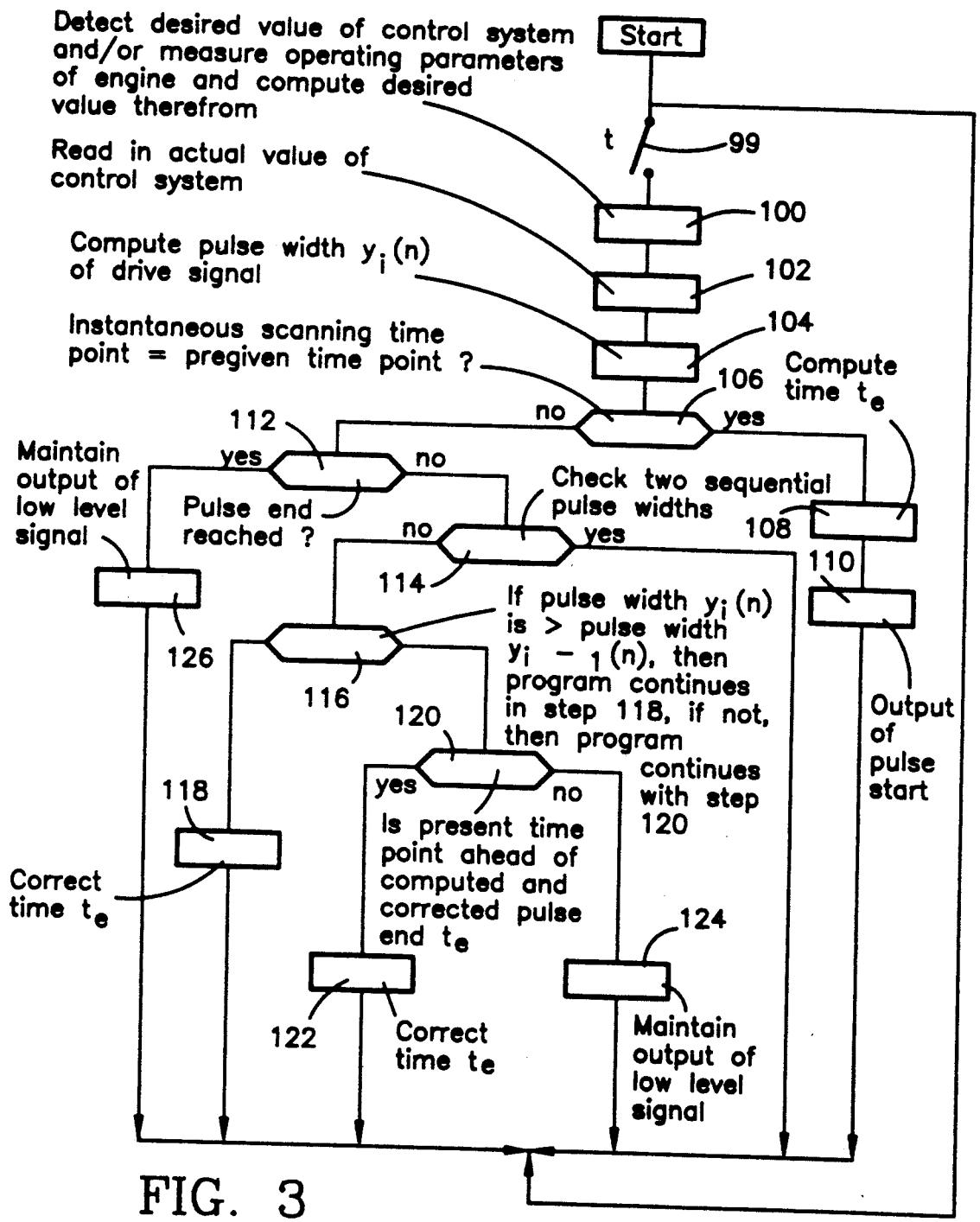

A possibility of realizing the procedure outlined above for determining the pulse width or the pulse duty factor of the drive signal is shown in FIG. 3 in the context of a flowchart for the computer unit 34. At the start of an operating cycle of the motor vehicle after the starting procedure of the vehicle has been passed through, the program part shown in FIG. 3 is started and initialized. This program part is executed at each of the pregiven scanning time points $t_i$ which is represented schematically by the switch 99. In a first step 100, the desired value of the control system is detected and/or the operating parameters of the engine applied for forming the desired value are measured and the desired value computed therefrom. The actual value of the control system is read in at the next step 102. Finally in step 104, the pulse width $y_i(n)$ of the drive signal needed for reducing the desired-actual difference is computed on the basis of the difference between the desired and actual values as well as on the basis of the known controller algorithm such as for a controller having a P-component, I-component and/or D-component.

In step 106, the inquiry is made as to whether the instantaneous scanning time point corresponds to the fixed pregiven time point of the start of a drive period. If this is the case, the component program continues with step 108 in that a time is computed on the basis of the pulse width of the drive signal computed in step 104 which corresponds to the time point of the pulse end of the particular drive period. This time $t_e$ is then a measure for the time length of the pulse. The output of the pulse start takes place in step 110 by outputting a higher signal level. Thereafter, the program sequence is started anew at the next scanning time point.

At the next scanning time point, the detection and computation of the desired value, the actual value and the pulse width derived therefrom is again carried out according to steps 100 to 104 and, in inquiry step 106, the determination is made that the instantaneous scanning time point does not correspond to the start of the drive period. Then the program part is continued with the inquiry step 112 with the aid of which the determination is made as to whether the time computed in step 108 or the time point computed there has already passed or has been reached. This inquiry corresponds to the determination as to whether the pulse end has been reached.

If the instantaneous time point is disposed between the start of a drive period and the computed end of the drive pulse (inquiry step 106, 112), then the program part is continued with inquiry step 114. The step 114 checks two sequential pulse widths computed in step 104. If the two sequentially computed pulse widths are the same or if the amount of their difference lies below or within a pregiven tolerance threshold or precision threshold, then the program sequence is ended and continued anew at the next scanning time point $t_i$.

If in step 114, a difference is determined between the two pulse widths determined at sequential scanning time points, then the program part is continued in step 116 with the inquiry provided there as to whether the pulse width determined at the present scanning time point is greater than or less than the pulse widths $y_{i-1}(n)$ determined at the previous scanning time point. If an increase in pulse width is determined in step 116, that is if the pulse width $y_i(n)$ determined at the present time point is greater than the pulse width determined at the previous time point $y_{i-1}(n)$, then the program continues in step 118 with the correction of time $t_e$ computed in step 108. From the difference between the two pulse widths determined sequentially, a correcting time is determined which is added to the computed pulse end time and therewith a new corrected time $t_e$ is determined. This newly determined or corrected time identifies the pulse end as it has been determined on the basis of the pertinent desired and actual values. After step 118, the program sequence is again executed at the next scanning time point.

The assumption can be made that at a later scanning time point, the program sequence was executed corresponding to the above illustration as to the steps 100 to 106 and 112 to 116 and that in step 116, a reduction of the pulse width with respect to the present time point compared to the previous time point will be determined. Based on this assumption, the program can continue with step 120 and the inquiry as to whether the present time point is ahead of the computed and corrected pulse end $t_e$. If this is the case, a correction of the time $t_e$ representing the pulse end can be undertaken in step 122 (corresponding to step 118) and the program sequence can be carried out again at the next scanning time point.

If the computed pulse end $t_e$ is reached between the scanning time points, then the pulse is automatically ended by a return to the lower signal level. Accordingly, if it is determined after the inquiry step 120 that the present scanning time point lies after the end of the pulse when viewed in time, then a correction is not made and the output of the low signal level according to step 124 is maintained. The same reaction takes place in step 126 which follows inquiry step 112 if it is there determined that the pulse end has already been reached or exceeded. In the same manner, the program sequence is ended after the steps 124 or 126 and started anew at the next scanning time point.

The pulse widths determined at the scanning time points, which lie between the pulse end and the pulse start of the next drive period, function in another embodiment as the starting point according to the above procedure for computing the pulse width at the beginning of the next drive period.

In lieu of the difference between the two sequential pulse widths, the difference between the now pertinent and a mean value of the previous or between the now pertinent pulse width and an earlier pulse width can be determined in inquiry step 114.

It is understood that the foregoing description is that of the preferred embodiments of the invention and that various changes and modifications may be made thereto without departing from the spirit and scope of the invention as defined in the appended claims.

What is claimed is:

1. A digital control system for an internal combustion engine of a motor vehicle, the system comprising:
    an electrically actuable element for influencing an operating variable of the engine;
    a control unit for acting on said element with a pulse-shaped drive signal having a series of pulses to influence said operating variable;
    said control unit including a computing unit for generating said pulse-shaped drive signal;
    sensor means for detecting a plurality of measured values at each of a series of predetermined scanning time points;
    each pulse of said pulse-shaped signal being defined by a changeable pulse width (y) and a fixed period (T);
    means for computing said pulse width (y) in dependence upon at least one of said measured values at each scanning time point ($t_i$) and with the time interval of two scanning time points being small relative to said fixed period (T) of said pulse-shaped signal; and,
    said computing unit including mans for correcting a pulse end time point of a current pulse in correspondence to the last computed pulse width ($y_i$) while said control unit emits said current pulse in correspondence to the computed pulse width preceding said last computed pulse width ($y_{i-1}$) to be corrected.

2. The control system of claim 1, wherein said pulse-shaped drive signal has a pulse duty cycle changeable via the pulse width at a pregiven signal frequency; and, said pulse width being changed in dependence upon the measured values occurring during a pulse.

3. The control system of claim 1, wherein said pulse-shaped drive signal is provided for driving an electrically actuable actuating element.

4. The control system of claim 3, said element coacting with one of the following systems: wheel slip control, air metering or fuel metering.

5. The control system of claim 1, wherein the time point of the end of the pulse of said pulse-shaped signal is computed at each scanning time point when the current scanning time point is coincident with the start of a pulse pregiven from the period of said signal.

6. The control system of claim 5, wherein a higher signal level is emitted at he start of a pulse.

7. The control system of claim 5, wherein a lower signal level is emitted when the pulse end is reached.

8. The control system of claim 5, wherein the end time point of the pulse is corrected on the basis of the current pulse width when the current scanning time point lies between the start time point and the end time point and when the previously computed pulse width and the current computed pulse width deviate from each other by a predetermined amount.

9. The control system of claim 8, wherein a correction is made only when the present time point lies forward of the corrected end time point of the pulse.

10. The control system of claim 10, wherein an actual value is detected at each scanning time point and a desired value is determined on the basis of operating variables detected at each scanning time point; and, said pulse width is computed at each scanning time point in dependence upon the deviation of said actual value from said desired value.

* * * * *

UNITED STATES PATENT AND TRADEMARK OFFICE
CERTIFICATE OF CORRECTION

PATENT NO. : 5,279,271
DATED : January 18, 1994
INVENTOR(S) : Michael Hofsaess, Martin Rutz and Harald Schweren It is certified that error appears in the above-identified patent and that said Letters Patent is hereby corrected as shown below:

In column 3, line 35: delete "he", and substitute -- the --.

In column 5, line 41: between "(n)" and "In", insert -- . --.

In column 8, line 23: delete "$(y_{1-1})$" and substitute -- $(y_{i-1})$ -- therefor.

In column 8, line 42: delete "he" and substitute -- the -- therefor.

In column 8, line 55: delete "claim 10," and substitute -- claim 1, -- therefor.

Signed and Sealed this

Fourteenth Day of June, 1994

Attest:

BRUCE LEHMAN

*Attesting Officer*   *Commissioner of Patents and Trademarks*